US008960050B2

(12) United States Patent
Cymbal et al.

(10) Patent No.: US 8,960,050 B2
(45) Date of Patent: Feb. 24, 2015

(54) LOCK LEVER ON STEERING COLUMN

(75) Inventors: William D. Cymbal, Freeland, MI (US); Michael P. Anspaugh, Bay City, MI (US); Damir Menjak, Frankenmuth, MI (US); Olivier Pugliese, Clarkston, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 599 days.

(21) Appl. No.: 12/429,647

(22) Filed: Apr. 24, 2009

(65) Prior Publication Data

US 2009/0205460 A1 Aug. 20, 2009

Related U.S. Application Data

(62) Division of application No. 11/328,372, filed on Jan. 9, 2006, now abandoned.

(51) Int. Cl.
*B62D 1/184* (2006.01)

(52) U.S. Cl.
CPC ...................................... *B62D 1/184* (2013.01)
USPC .............................................. 74/523; 74/493

(58) Field of Classification Search
USPC ........... 74/492, 493, 523–525, 529, 547, 519; 280/775, 777; 403/2
IPC ...................................................... B62D 1/184
See application file for complete search history.

(56) References Cited

U.S. PATENT DOCUMENTS

| | | | | |
|---|---|---|---|---|
| 752,738 | A * | 2/1904 | Wheeler | 74/43 |
| 2,317,672 | A * | 4/1943 | Cooley | 292/347 |
| 2,849,892 | A | 9/1958 | Du Shane | |
| 3,464,288 | A | 9/1969 | Sheridan | |
| 3,513,720 | A * | 5/1970 | Allport | 74/553 |
| 3,561,281 | A | 2/1971 | Wilfert | |
| 3,602,065 | A * | 8/1971 | Ratcliff | 74/524 |
| 3,750,492 | A | 8/1973 | Holmes, Jr. | |
| 3,977,692 | A * | 8/1976 | Findley et al. | 280/775 |
| 4,075,903 | A * | 2/1978 | Cornell | 74/493 |
| 4,244,237 | A * | 1/1981 | Sprunger | 74/493 |
| 5,050,442 | A * | 9/1991 | Reed | 74/42 |
| 5,992,261 | A * | 11/1999 | Iwata et al. | 74/473.1 |
| 6,029,535 | A | 2/2000 | Kenny et al. | |
| 6,029,536 | A | 2/2000 | Sugiyama | |
| 6,047,611 | A * | 4/2000 | Warren et al. | 74/489 |
| 6,082,216 | A | 7/2000 | Watanabe et al. | |
| 6,120,412 | A | 9/2000 | Fujinuma | |

(Continued)

*Primary Examiner* — Thomas Diaz
(74) *Attorney, Agent, or Firm* — Cantor Colburn LLP (57) ABSTRACT

The invention provides a lever assembly for controlling a lock of a steering column assembly. The lever assembly includes a first lever portion pivotable about a locking axis between a locked position for substantially preventing adjusting movement of a steering column assembly and an unlocked position spaced from the locked position. The steering column assembly is moveable in adjusting movement when the first lever portion is in the unlocked position. The lever assembly also includes a second lever portion defining a handle portion and operable to rotate about the locking axis. The lever assembly also includes a lost motion linkage disposed between the first lever portion and the second lever portion. The lost motion linkage is operable to transmit rotation of the second lever portion about the locking axis to pivot the first lever portion between the locked position and the unlocked position. The lost motion linkage is also operable to yield in response to movement of the second lever portion in a direction parallel to the locking axis.

11 Claims, 8 Drawing Sheets

(56) References Cited

U.S. PATENT DOCUMENTS

| | | |
|---|---|---|
| 6,205,882 B1 | 3/2001 | Jolley |
| 6,272,945 B1 | 8/2001 | Jolley |
| 6,286,385 B1 | 9/2001 | Nishimura et al. |
| 6,439,074 B1 | 8/2002 | Stencel |
| 6,460,426 B1 | 10/2002 | Kataumi et al. |
| 6,460,427 B1 | 10/2002 | Hedderly |
| 6,526,842 B1 | 3/2003 | Tanaka et al. |
| 6,584,870 B2 | 7/2003 | Nishimura et al. |
| 6,637,285 B2 | 10/2003 | Jolley |
| 6,776,066 B2 | 8/2004 | Braun et al. |
| 7,201,080 B1 * | 4/2007 | Canonico .................... 74/502.2 |
| 2009/0107278 A1 | 4/2009 | Vermeersch |

* cited by examiner

LOCK LEVER ON STEERING COLUMN

This is a divisional application that claims priority to a non-provisional patent application Ser. No. 11/328,372 filed on Jan. 9, 2006 and incorporated herein by reference in its entirety.

FIELD OF THE INVENTION

The invention relates to steering column assemblies and more particularly to a lever for moving a steering column between locked and unlocked positions.

BACKGROUND OF THE INVENTION

Vehicles are often equipped with steering columns that adjust the position of the steering wheel to enhance the comfort and safety of the driver. For example, the steering column may telescope to move closer to and away from the driver. Also, the position of the steering wheel may be tilted or raked relative to other components of the column. These features cooperate to allow the driver to adjust the steering wheel to a desired, convenient position for operating the vehicle, and for enabling the wheel to be moved out of the way to provide greater access to getting into and out of the driver's seat of the vehicle. Adjustable steering columns also include locks for maintaining the steering column in the desired position. Steering column locks can be mechanical or electro-mechanical. It is important to lock the steering column between adjustments and while the vehicle is moving to enhance the safe operation of the vehicle.

SUMMARY OF THE INVENTION

The invention provides a lever assembly for controlling a lock of a steering column assembly. The lever assembly includes a first lever portion pivotable about a locking axis between a locked position for substantially preventing adjusting movement of a steering column assembly and an unlocked position spaced from the locked position. The steering column assembly is moveable in adjusting movement when the first lever portion is in the unlocked position. The lever assembly also includes a second lever portion defining a handle portion and operable to rotate about the locking axis. The lever assembly also includes a lost motion linkage disposed between the first lever portion and the second lever portion. The lost motion linkage is operable to transmit rotation of the second lever portion about the locking axis to pivot the first lever portion between the locked position and the unlocked position. The lost motion linkage is also operable to yield in response to movement of the second lever portion in a direction parallel to the locking axis.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIGS. 1-4, in a first exemplary embodiment of the invention, a lever assembly 10 for controlling a lock 12 of a steering column assembly 14. The lever assembly 10 includes a first lever portion 16 pivotable about a locking axis 18 between a locked position for substantially preventing adjusting movement of a steering column assembly 14 and an unlocked position spaced from the locked position. The steering column assembly 14 is moveable in adjusting movement when the first lever portion 16 is in the unlocked position. The lever assembly 10 also includes a second lever portion 20 defining a handle portion 22 and operable to rotate about the locking axis 18. The lever assembly 10 also includes a lost motion linkage 24 disposed between the first lever portion 16 and the second lever portion 20. The lost motion linkage 24 is operable to transmit rotation of the second lever portion 20 about the locking axis 18 to pivot the first lever portion 16 between the locked position and the unlocked position. The lost motion linkage 24 is also operable to yield in response to movement of the second lever portion 20 in a direction parallel to the locking axis 18.

Lost motion refers to a difference between the motion of a driver and that of a follower. A lost motion device or linkage allows for motion of the follower in response to motion of the driver over a certain range or in a certain direction. A lost motion device yields in response to movement of the driver beyond the predetermined range or in response to direction of the driver in one or more directions. In the exemplary embodiments of the invention, the follower is the first lever portion and the driver is the second lever portion. The lost motion linkages of the exemplary embodiments of the invention allow for motion of the various first lever portions in response to rotation of the various second lever portions about the axis. The lost motion linkages of the exemplary embodiments of the invention yield in response to movement of the various second lever portions in a direction parallel to the axis. A direction parallel to the axis can occur if the second lever portion rotates relative to the lost motion linkage.

Figure 1:
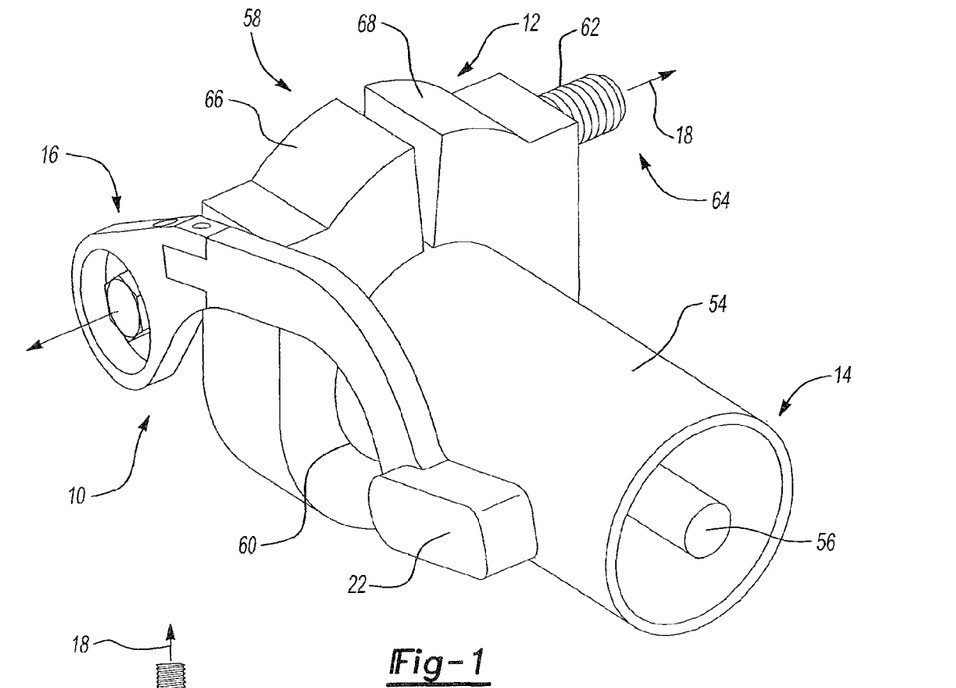
FIG. 1 is a schematic perspective view of a steering column assembly with a lock and a lever assembly according to a first exemplary embodiment of the invention.

In the first exemplary embodiment of the invention, the steering column assembly 14 includes a steering column jacket 54 operable to support a steering shaft 56 in a vehicle. A steering wheel (not shown) can be engaged at one end of the steering shaft 56. A collar 58 presents a surface 60 for guiding movement of the steering column jacket 54. The collar 58 can guide sliding movement of the steering column jacket 54, corresponding to telescoping movement, or can guide raking movement of the steering column jacket 54 in alternative embodiments of the invention. Also, in other embodiments of the invention, the collar 58 can be integrally formed with a first steering column jacket and guide movement of a second steering column jacket.

The exemplary lock 12 includes a locking member 62 is operable to move in a first direction from an unlocked position to a locked position to increasingly urge the steering column jacket 54 and the surface 60 together to lock relative movement between the steering column jacket 54 and the collar 60. In the first exemplary embodiment of the invention, the locking member 62 is thread defined on the outer surface of a shaft 64. The thread of the locking member 62 is engaged with collar 58 at two positions of the collar 58. The collar 58 is c-shaped and includes first and second side walls 66, 68 integrally formed with respect to one another. The first and second side walls 66, 68 define the surface 60. The locking member 62 urges the first and second side walls 66, 68 together.

The first lever portion 16 is connected to the shaft for pivoting movement about the locking axis 18. The shaft 64 is operable to pivot in a first angular direction about the locking axis 18 to move the locking member 62 in the first direction. FIG. 1 shows the locking member 62 in the unlocked position. The collar 58 defines a gap between the first and second side walls 66, 68 and the steering column jacket 54 can move relative to the collar 58. Pivoting movement of the shaft 64 about the axis 18 moves each individual thread of the locking member 62. Pivoting movement of the shaft 64 in a first angular direction moves the locking member 62 toward the locked position and pivoting movement of the shaft 64 in a second direction opposite the first angular direction moves the locking member 62 toward the unlocked position. After the shaft 64 has been pivoted to move the locking member 62 to the locked position, the gap between first and second side walls 66, 68 closes in the first exemplary embodiment of the invention. However, in alternative embodiments of the invention, a gap may still exist between the side walls 66, 68 of the collar 58 after the locking member 62 has been moved to the locked position.

The lock 12 and the steering column assembly 14 are exemplary. In alternative embodiments of the invention, different locking structures can be used to practice the invention, such as wedge locks, positive locks with detents and/or teeth, or electro-mechanical locks. Also, any configuration of steering column assembly can be used to practice the invention including telescoping columns, raking columns, tilting columns, and any combination of telescoping, raking and tilting columns.

Figure 2:
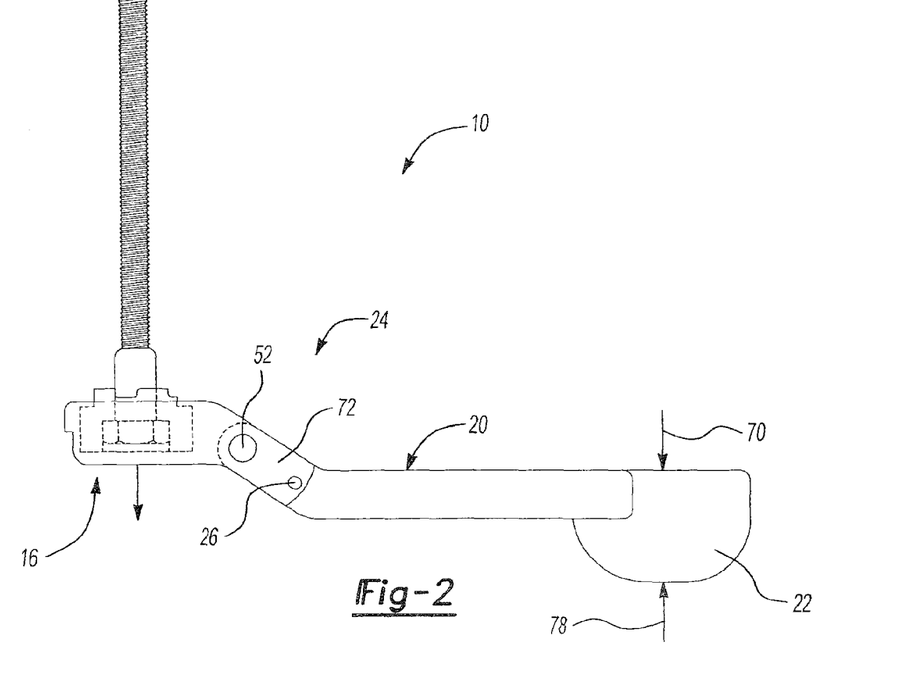
FIG. 2 is a top view of the first exemplary lever assembly having a first lever portion, a second lever portion and a lost motion linkage wherein the lost motion linkage is disposed to transmit rotation of the second lever portion about an axis to the first lever portion.
Figure 3:
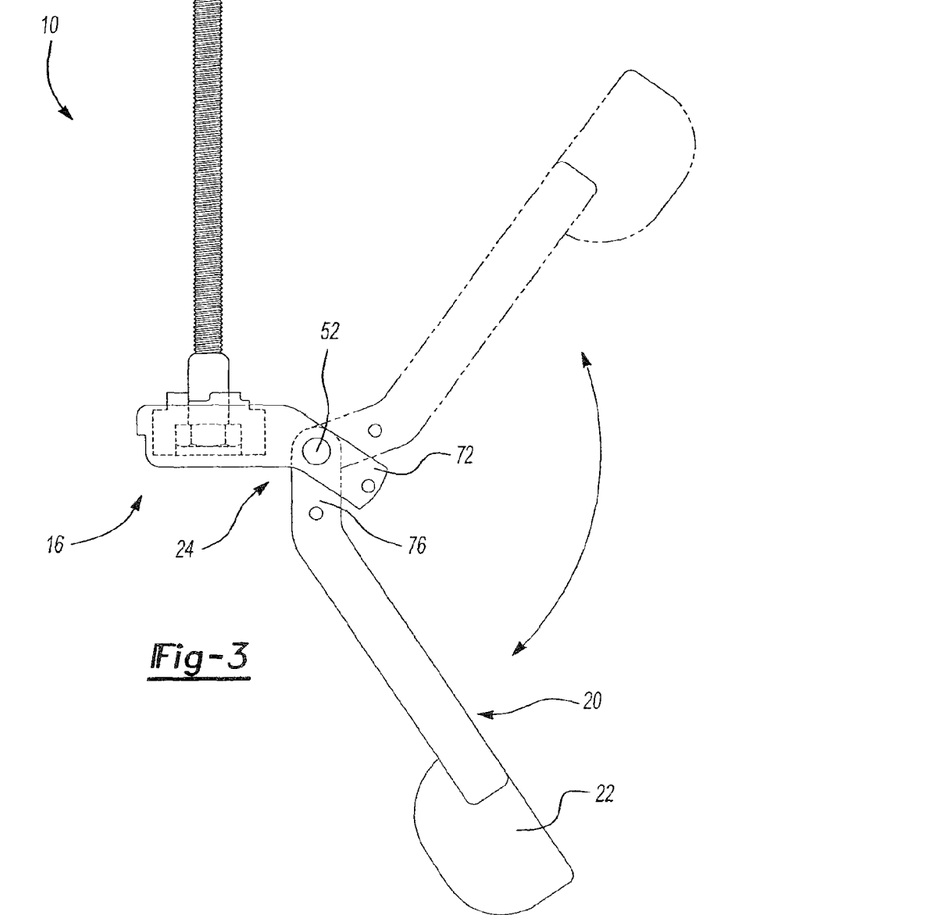
FIG. 3 is a top view of the first exemplary lever assembly wherein the lost motion linkage has yielded to movement of the second lever portion in a direction parallel to the axis.
Figure 4:
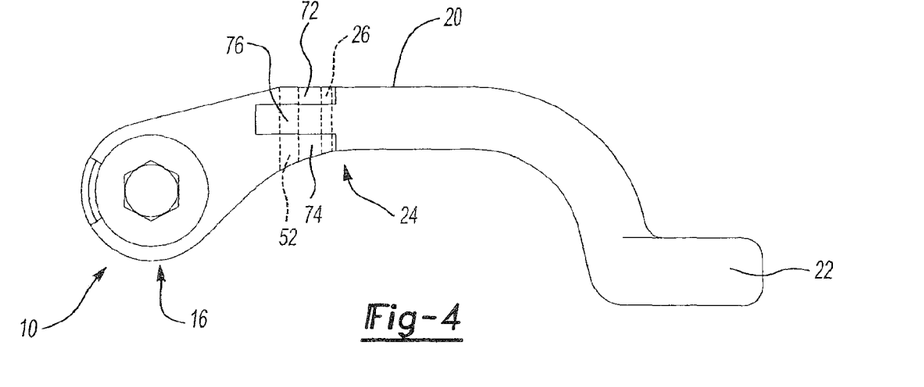
FIG. 4 is a front view of the first exemplary lever assembly.

FIG. 2 shows the lever assembly 10 disposed to transmit rotation of the second lever portion 20 about the axis 18 to pivot the first lever portion 16 about the axis 18 and lock or unlock the lock 12. In operation, the second lever portion 20 may extend downward, toward a floor of the vehicle when the lock 12 is unlocked. If a driver of the vehicle were to leave the second lever portion 20 extending downward and attempt to exit the vehicle, the driver's knee may contact the second lever portion 20 and urge movement of the second lever portion 20 in a direction 70 or in a direction 78. The lost motion linkage 24 allows the second lever portion 20 to move relative to first lever portion 16 in such an event, as best shown in FIG. 3.

The first exemplary lost motion linkage 24 includes interlocking arms 72, 74, 76. The arms 72, 74 are integrally formed with the first lever portion 16 and the arm 76 is integrally formed with the second lever portion 20. A pivot pin 52 extends through the arms 72, 74, 76 to pivotally connect the first lever portion 16 and the second lever portion 20. Preferably, the second lever portion 20 is rotated when the arms 72, 74, 76 are aligned and overlap one another, as best shown in FIG. 1. However, the second lever portion 20 could be rotated when the arms 72, 74, 76 are not aligned and overlapping one another, as best shown in FIG. 2, if the arms 72, 74, 76 are sized appropriately.

The lost motion linkage 24 is breakable in response to movement of the second lever portion 20 in a direction parallel to the locking axis 18. The lost motion linkage 24 also includes a mechanical fuse 26. The mechanical fuse 26 is a shear pin 26. The shear pin 26 extends through the arms 72, 74, 76 and is spaced from the pivot pin 52. When the second lever portion 20 rotates about the pivot pin 52 relative to the first lever portion 16, the shear pin 26 is broken. Thus, the first exemplary lost motion linkage 24 yields by being broken. The shear pin 26 can be replaced rather than replacing the entire lever assembly 10.

Figure 5:
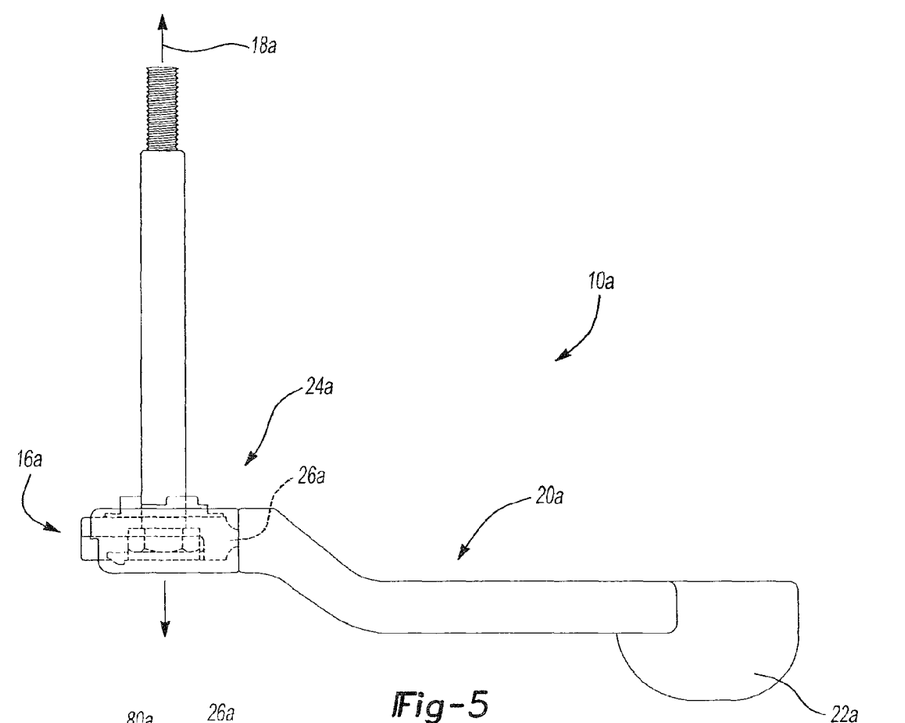
FIG. 5 is a top view of a second exemplary lever assembly.
Figure 6:
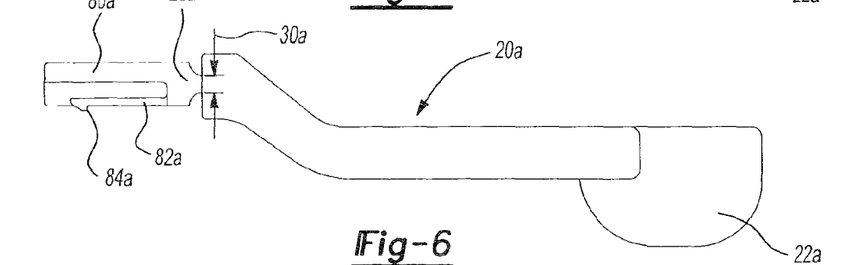
FIG. 6 is a top view of a second lever portion of the second exemplary lever assembly and part of a lost motion linkage of the second exemplary lever assembly.
Figure 7:
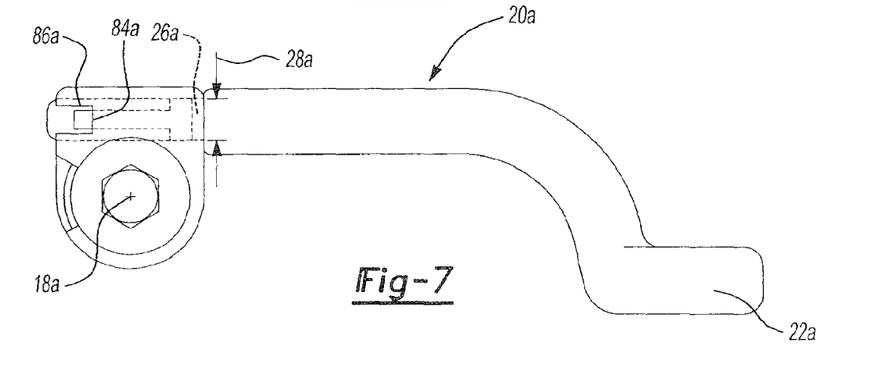
FIG. 7 is a front view of the second exemplary lever assembly.

Referring now to FIGS. 5-7, in a second exemplary embodiment of the invention, a lever assembly 10a for controlling a lock of a steering column assembly, such as lock 12 and steering column assembly 14 of the first exemplary embodiment of the invention. The lever assembly 10a includes a first lever portion 16a pivotable about a locking axis 18a between a locked position for substantially preventing adjusting movement of a steering column assembly 14 and an unlocked position spaced from the locked position. The steering column assembly 14 is moveable in adjusting movement when the first lever portion 16a is in the unlocked position. The lever assembly 10a also includes a second lever portion 20a defining a handle portion 22a and operable to rotate about the locking axis 18a. The lever assembly 10a also includes a lost motion linkage 24a disposed between the first lever portion 16a and the second lever portion 20a. The lost motion linkage 24a is operable to transmit rotation of the second lever portion 20a about the locking axis 18a to pivot the first lever portion 16a between the locked position and the unlocked position. The lost motion linkage 24a is also operable to yield in response to movement of the second lever portion 20a in a direction parallel to the locking axis 18a.

The second exemplary lost motion linkage 24a includes a body 80a defining a cantilevered snap arm 82a. The snap arm 82a defines a snap edge 84a. The body 80a is integrally formed with the second lever portion 20a and received a cavity (not visible) formed in the first lever portion 16a. The snap edge 84a of the lost motion linkage 24a is received in a snap recess 86a formed in the first lever portion 16a to connect the first lever portion 16a with the second lever portion 20a.

The lost motion linkage 24a is breakable in response to movement of the second lever portion 20a in a direction parallel to the locking axis 18a. The lost motion linkage 24a includes a mechanical fuse 26a. The mechanical fuse 26a is a narrowed portion of the body portion 80a. The mechanical fuse 26a includes a height 28a extending in a direction transverse to the locking axis 18a and a width 30a extending in a direction parallel to the locking axis 18a. The height 28a is greater than the width 30a so that the fuse 26a will not break during normal operation, when the driver engages the handle portion 22a to lock or unlock the lock of the steering column assembly. The width 30a is less than the height 28a so that the fuse 26a will break in response to movement of the second lever portion 20a in a direction parallel to the locking axis 18a, such as when a driver of the vehicle contacts the second lever portion 20a during exit or entry of the vehicle. In the second exemplary embodiment of the invention, the height 28a is twice the width 30a. Thus, the second exemplary lost motion linkage 24a yields by being broken. The second lever portion 20a and integrally formed lost motion linkage 24a can be replaced rather than replacing the entire lever assembly 10a.

Figure 8:
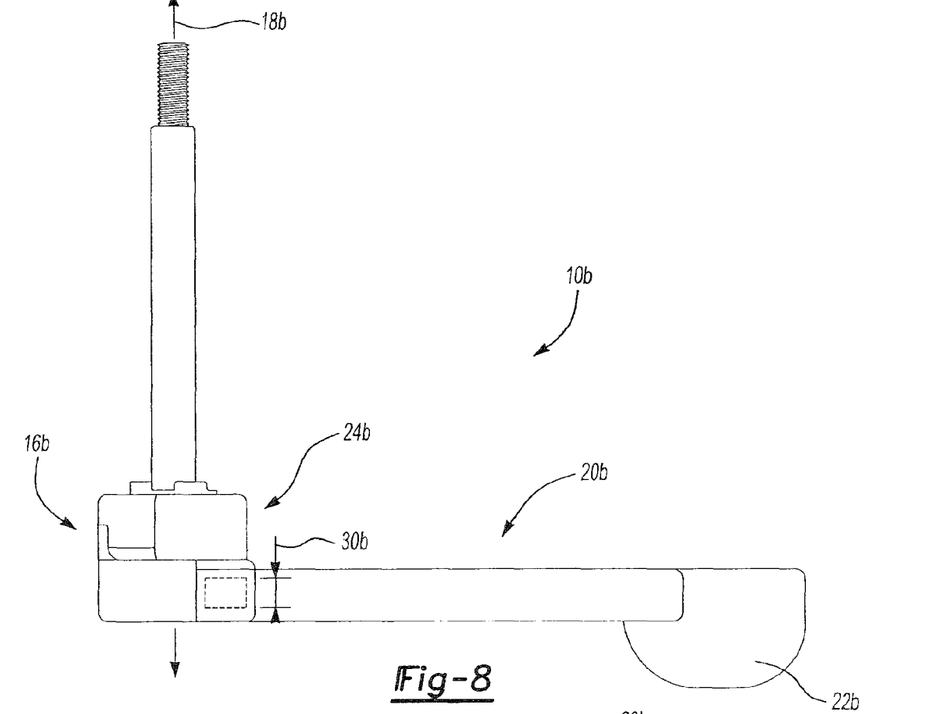
FIG. 8 is a top view of a third exemplary lever assembly.
Figure 9:
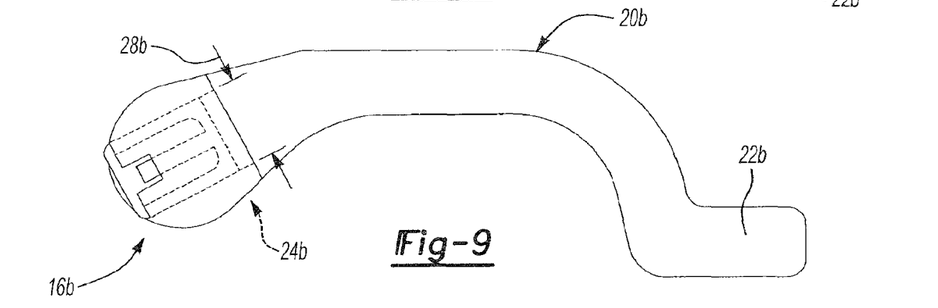
FIG. 9 is a front view of the third exemplary lever assembly.
Figure 10:
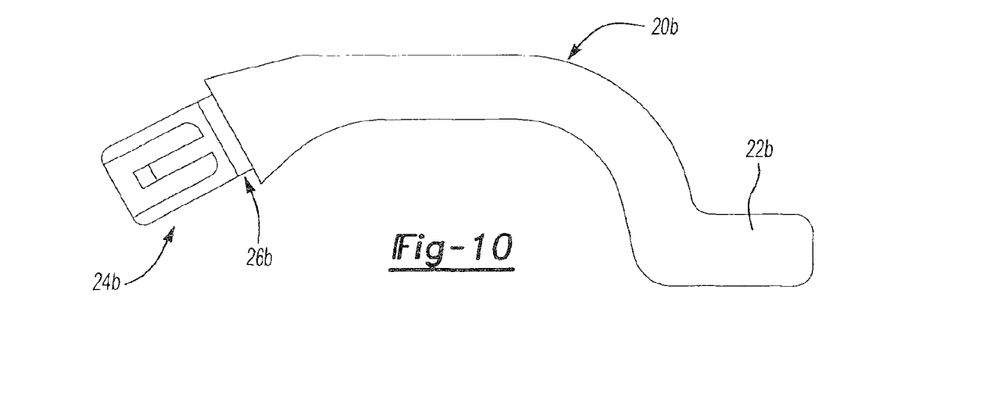
FIG. 10 is a front view of a second lever portion and part of a lost motion linkage of the third exemplary lever assembly.
Figure 11:
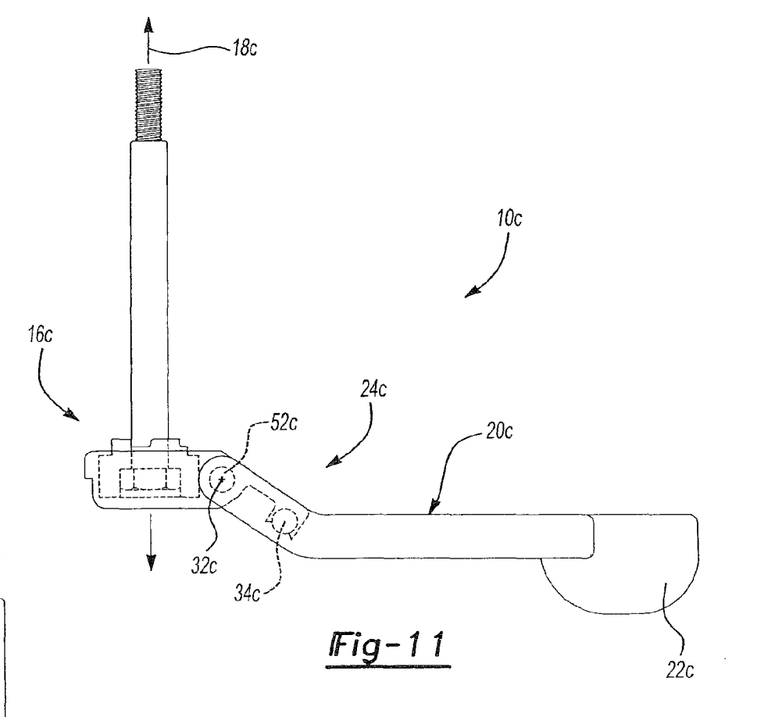
FIG. 11 is a top view of a fourth exemplary lever assembly.
Figure 12:
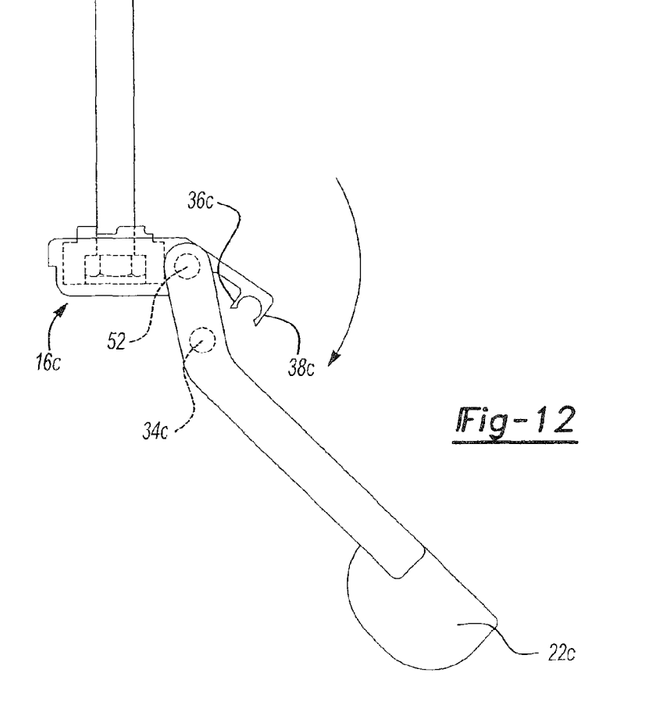
FIG. 12 is a top view of the fourth exemplary lever assembly wherein a lost motion linkage has yielded to movement of a second lever portion in a direction parallel to an axis of rotation.
Figure 13:
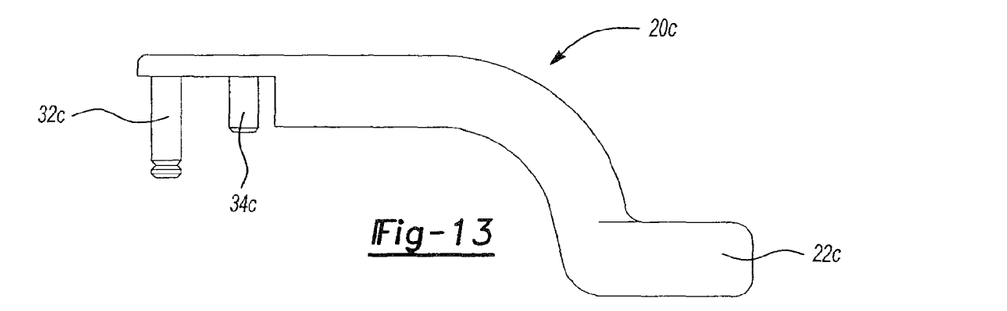
FIG. 13 is a front view of the second lever portion and part of the lost motion linkage of the fourth exemplary lever assembly.
Figure 14:
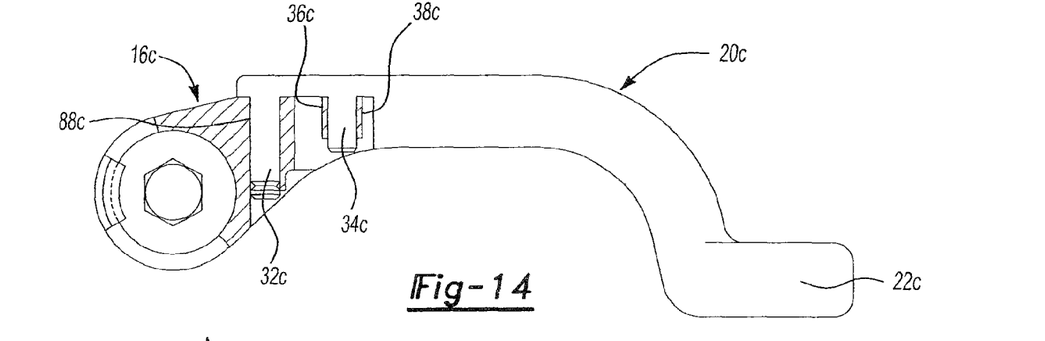
FIG. 14 is a front view of the fourth exemplary lever assembly with a portion cut-away.

Referring now to FIGS. 8-10, in a third exemplary embodiment of the invention, a lever assembly 10b for controlling a lock of a steering column assembly, such as lock 12 and steering column assembly 14 of the first exemplary embodiment of the invention. The lever assembly 10b includes a first lever portion 16b pivotable about a locking axis 18b between a locked position for substantially preventing adjusting movement of a steering column assembly 14 and an unlocked position spaced from the locked position. The steering column assembly 14 is moveable in adjusting movement when the first lever portion 16b is in the unlocked position. The lever assembly 10b also includes a second lever portion 20b defining a handle portion 22b and operable to rotate about the locking axis 18b. The lever assembly 10b also includes a lost motion linkage 24b disposed between the first lever portion 16b and the second lever portion 20b. The lost motion linkage 24b is operable to transmit rotation of the second lever portion 20b about the locking axis 18b to pivot the first lever portion 16b between the locked position and the unlocked position. The lost motion linkage 24b is also operable to yield in response to movement of the second lever portion 20b in a direction parallel to the locking axis 18b.

The third exemplary lost motion linkage 24b is constructed similarly and operates similarly as the second exemplary lost motion linkage 24a. The lost motion linkage 24b includes a mechanical fuse 26b having a height 28b extending in a direction transverse to the locking axis 18b and a width 30b extending in a direction parallel to the locking axis 18a. The height 28b is greater than the width 30b so that the fuse 26b will not break during normal operation, when the driver engages the handle portion 22b to lock or unlock the lock of the steering column assembly. The width 30b is less than the height 28b so that the fuse 26b will break in response to movement of the second lever portion 20b in a direction parallel to the locking axis 18b, such as when a driver of the vehicle contacts the second lever portion 20b during exit or entry of the vehicle. Thus, the second exemplary lost motion linkage 24b yields by being broken. The second lever portion 20b and integrally formed lost motion linkage 24b can be replaced rather than replacing the entire lever assembly 10a. The difference between the second and third exemplary embodiments of the invention is that the second lever portion 20b and the lost motion linkage 24b define a more pronounce bend than the second lever portion 20a and the lost motion linkage 24a.

Referring now to FIGS. 11-14, in a fourth exemplary embodiment of the invention, a lever assembly 10c for controlling a lock of a steering column assembly, such as lock 12 and steering column assembly 14 of the first exemplary embodiment of the invention. The lever assembly 10c includes a first lever portion 16c pivotable about a locking axis 18c between a locked position for substantially preventing adjusting movement of a steering column assembly 14 and an unlocked position spaced from the locked position. The steering column assembly 14 is moveable in adjusting movement when the first lever portion 16c is in the unlocked position. The lever assembly 10c also includes a second lever portion 20c defining a handle portion 22c and operable to rotate about the locking axis 18c. The lever assembly 10c also includes a lost motion linkage 24c disposed between the first lever portion 16c and the second lever portion 20c. The lost motion linkage 24c is operable to transmit rotation of the second lever portion 20c about the locking axis 18c to pivot the first lever portion 16c between the locked position and the unlocked position. The lost motion linkage 24c is also operable to yield in response to movement of the second lever portion 20c in a direction parallel to the locking axis 18c.

The fourth exemplary lost motion linkage 24c includes an aperture 88c formed in the first lever portion 16c and a pivot pin 52c extending from the second lever portion 20c and through the aperture 88c to pivotally connect the first lever portion 16c and the second lever portion 20c about a pivot axis 32c. The lost motion linkage 24c also includes a locking pin 34c spaced from the pivot axis 32c and integrally formed with respect to the second lever portion 20c. The lost motion linkage 24c also includes first and second opposing jaws 36c, 38c integrally formed with respect to the first lever portion 16c. The jaws 36c, 38c receive the locking pin 34c during normal operation, such as when the driver engages the handle portion 22c to unlock or unlock the lock of the steering column assembly.

The lost motion linkage 24c is resiliently deformable in response to movement of the second lever portion 20c in a direction parallel to the locking axis 18c. For example, when a driver of the vehicle contacts the second lever portion 20c during exit or entry of the vehicle, the locking pin 34c is operable to separate the first and second opposing jaws 36c, 38c in response to movement of the second lever portion 20c. Thus, the jaws 36c, 38c of the lost motion linkage 24c yield by resiliently deforming in response to movement of the second lever portion 20c in a direction parallel to the locking axis 18c. The locking pin 34c can be re-engaged between the jaws 36c, 38c after disengagement to restore the lever assembly 10c rather than being replaced.

Figure 15:
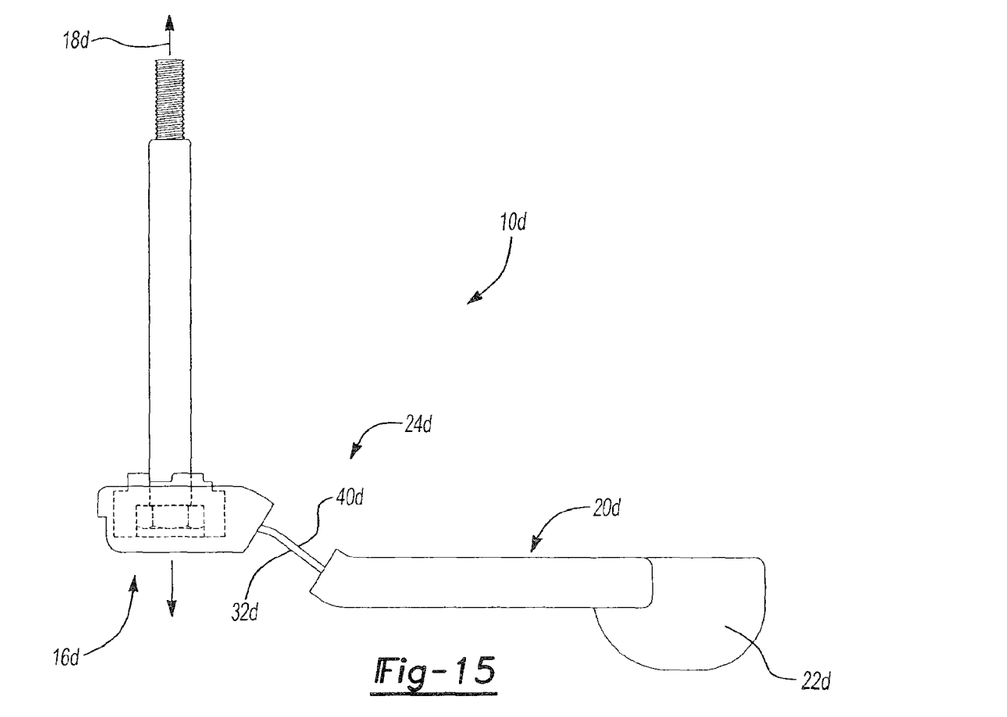
FIG. 15 is a top view of a fifth exemplary lever assembly.
Figure 16:
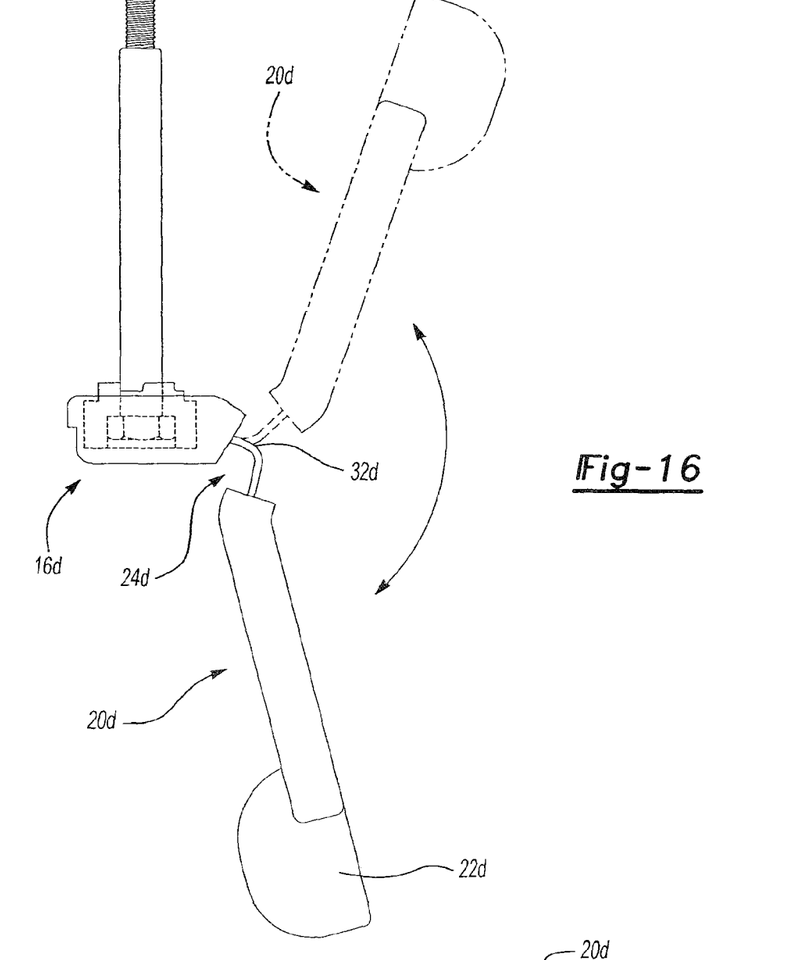
FIG. 16 is a top view of the fifth exemplary lever assembly wherein a lost motion linkage has yielded to movement of a second lever portion in a direction parallel to an axis of rotation.
Figure 17:
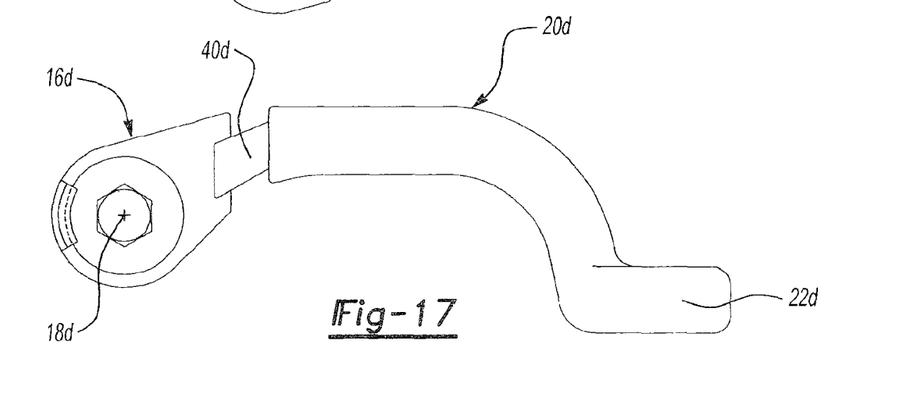
FIG. 17 is a front view of the fifth exemplary lever assembly.

Referring now to FIGS. 15-17, in a fifth exemplary embodiment of the invention, a lever assembly 10d for controlling a lock of a steering column assembly, such as lock 12 and steering column assembly 14 of the first exemplary embodiment of the invention. The lever assembly 10d includes a first lever portion 16d pivotable about a locking axis 18d between a locked position for substantially preventing adjusting movement of a steering column assembly 14 and an unlocked position spaced from the locked position. The steering column assembly 14 is moveable in adjusting movement when the first lever portion 16d is in the unlocked position. The lever assembly 10d also includes a second lever portion 20d defining a handle portion 22d and operable to rotate about the locking axis 18d. The lever assembly 10d also includes a lost motion linkage 24d disposed between the first lever portion 16d and the second lever portion 20d. The lost motion linkage 24d is operable to transmit rotation of the second lever portion 20d about the locking axis 18d to pivot the first lever portion 16d between the locked position and the unlocked position. The lost motion linkage 24d is also operable to yield in response to movement of the second lever portion 20d in a direction parallel to the locking axis 18d.

The fifth exemplary lost motion linkage 24d includes a leaf spring 40d. The leaf spring 40d is fixedly connected at one end to the first lever portion 16d and at a second end to the second lever portion 20d. The lost motion linkage 24d is resiliently deformable in response to movement of the second lever portion 20d in a direction parallel to the locking axis 18d. For example, when a driver of the vehicle contacts the second lever portion 20d during exit or entry of the vehicle, the second lever portion 20d can be moved from a first position corresponding to a preferred rotating position to a second position. The preferred rotating position is the position at which, during normal vehicle handling, the driver engages the handle portion 22d to unlock or unlock the lock of the steering column assembly. The second position can be any position spaced from the first position. Two alternative second positions are shown in FIG. 16, the leaf spring 40d being bendable in first and second opposite directions parallel to the locking axis 18d. During movement of the second lever portion 20d from the first position to the second position, the leaf spring 40d bends around a pivot axis 32d. Thus, the leaf spring 40d of the lost motion linkage 24d yields by resiliently deforming in response to movement of the second lever portion 20d in a direction parallel to the locking axis 18d. The leaf spring 40d can urge the second lever portion 20d back to the first position.

Figures 18, 19:
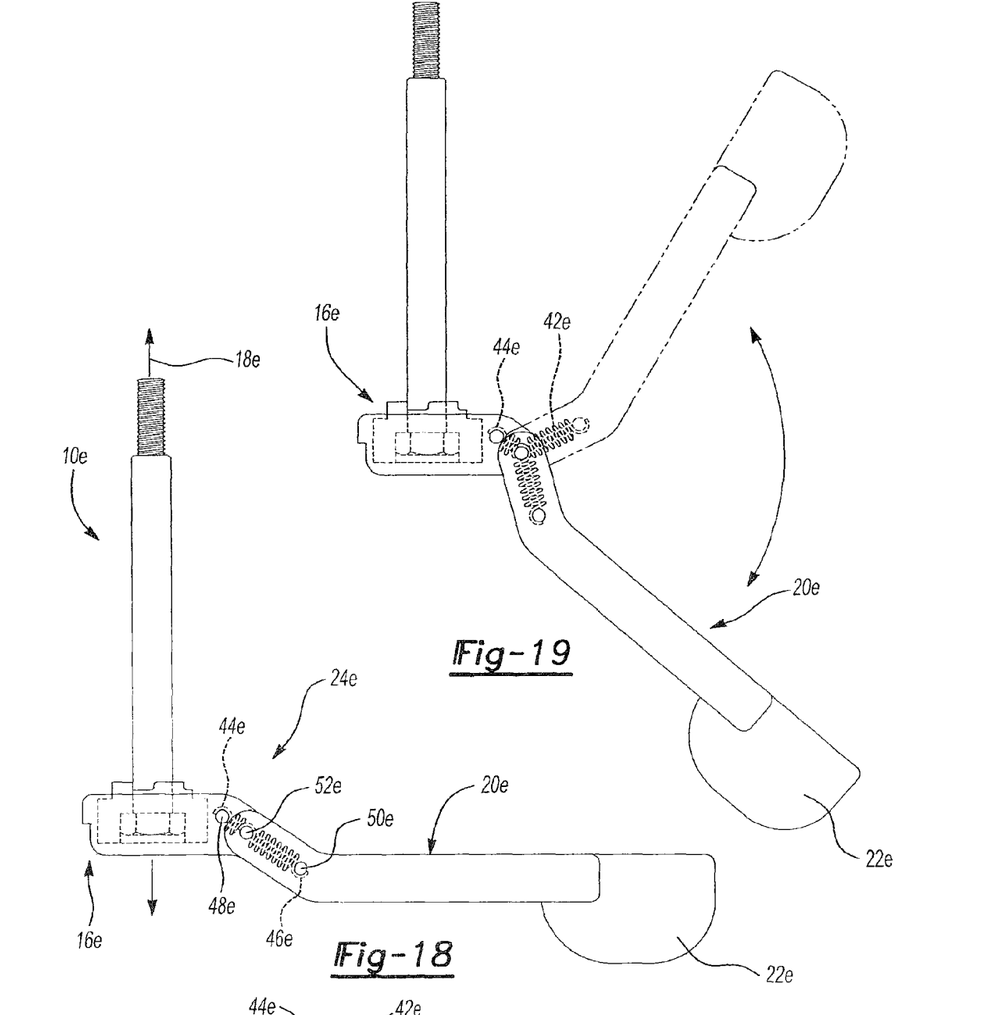
FIG. 18 is a top view of a sixth exemplary lever assembly.
FIG. 19 is a top view of the sixth exemplary lever assembly wherein a lost motion linkage has yielded to movement of a second lever portion in a direction parallel to an axis of rotation.
Figure 20:
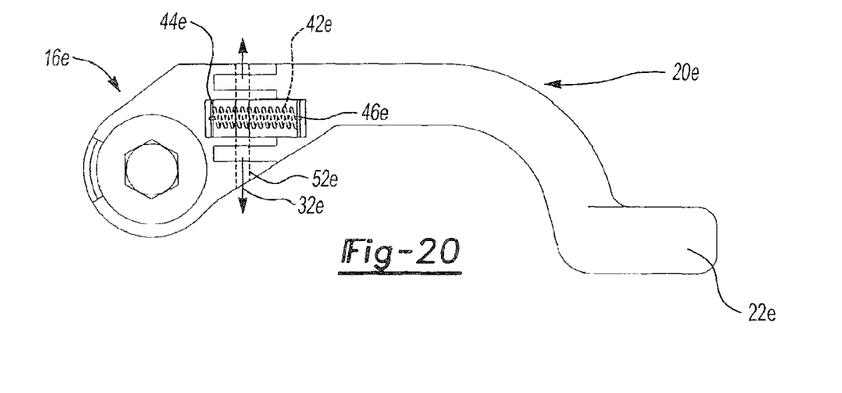
FIG. 20 is a front view of the sixth exemplary lever assembly.

Referring now to FIGS. 18-20, in a sixth exemplary embodiment of the invention, a lever assembly 10e for controlling a lock of a steering column assembly, such as lock 12 and steering column assembly 14 of the first exemplary embodiment of the invention. The lever assembly 10e includes a first lever portion 16e pivotable about a locking axis 18e between a locked position for substantially preventing adjusting movement of a steering column assembly 14 and an unlocked position spaced from the locked position. The steering column assembly 14 is moveable in adjusting movement when the first lever portion 16e is in the unlocked position. The lever assembly 10e also includes a second lever portion 20e defining a handle portion 22e and operable to rotate about the locking axis 18e. The lever assembly 10e also includes a lost motion linkage 24e disposed between the first lever portion 16e and the second lever portion 20e. The lost motion linkage 24e is operable to transmit rotation of the second lever portion 20e about the locking axis 18e to pivot the first lever portion 16e between the locked position and the unlocked position. The lost motion linkage 24e is also operable to yield in response to movement of the second lever portion 20e in a direction parallel to the locking axis 18e.

The sixth exemplary lost motion linkage 24e includes a coil spring 42e extending between a first end 44e and a second end 46e. The lost motion linkage 24e also includes a first anchor pin 48e connected to the first lever portion 16e and supporting the first end 44e of the coil spring 42e. The lost motion linkage 24e also includes a second anchor pin 50e connected to the second lever portion 20e and supporting the second end 46e of the coil spring 42e. The lost motion linkage 24e also includes a pivot pin 52e disposed between the first and second anchor pins 48e, 50e and defining the pivot axis 32e.

The lost motion linkage 24e is resiliently deformable in response to movement of the second lever portion 20e in a direction parallel to the locking axis 18e. For example, when a driver of the vehicle contacts the second lever portion 20e during exit or entry of the vehicle, the second lever portion 20e can be moved from a first position corresponding to a preferred rotating position to a second position. The preferred rotating position is the position at which, during normal vehicle handling, the driver engages the handle portion 22e to unlock or unlock the lock of the steering column assembly. The second position can be any position spaced from the first position. Two alternative second positions are shown in FIG. 19, the second lever portion 20e being pivotable in first and second opposite directions relative to the pivot axis 32e. During movement of the second lever portion 20e from the first position to the second position, the coil spring 42e is stretched. Thus, the coil spring 42e of the lost motion linkage 24e yields by resiliently deforming in response to movement of the second lever portion 20e in a direction parallel to the locking axis 18e. The coil spring 42e can urge the second lever portion 20e back to the first position.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lever assembly for controlling a lock of a steering column assembly, said lever assembly comprising:
   a first lever portion pivotable about a locking axis between a locked position for substantially preventing adjusting movement of the steering column assembly and an unlocked position spaced from said locked position;
   a second lever portion defining a handle portion and rotatable about said locking axis; and
   a lost motion linkage disposed between said first lever portion and said second lever portion, including a plurality of interlocking arms formed respectively with said first and second lever portions and a pivot pin extending through said arms substantially perpendicular to said locking axis to pivotally connect said first and second lever portions with each other and about which said second lever portion rotates relative to said first lever portion, operable to transmit rotation of said second lever portion about said locking axis to pivot said first lever portion between said locked and unlocked positions and allow said second lever portion to move relative to said first lever portion in response to rotation of said second lever portion relative to said lost motion linkage and, thus, movement of said second lever portion in a direction substantially parallel to said locking axis, and breakable in response to said movement.

2. The lever assembly of claim 1, wherein said lost motion linkage includes a mechanical fuse extending through said arms substantially perpendicular to said locking axis, spaced from said pivot pin, and configured to break when said second lever portion rotates about said pivot pin relative to said first lever portion.

3. The lever assembly of claim 2, wherein said mechanical fuse is a shear pin.

4. A lock assembly of a steering column assembly, said lock assembly comprising:
  a locking member that is pivotable in a first angular direction about a locking axis toward a locked position for substantially preventing adjusting movement of the steering column assembly and a second angular direction about said locking axis opposite said first angular direction and toward an unlocked position spaced from said locked position for adjusting movement of the steering column assembly; and
  a lever assembly for controlling said locking member and including:
    a first lever portion connected to said locking member for pivoting movement about said locking axis between said locked and unlocked positions of said locking member and, thus, the steering column assembly;
    a second lever portion defining a handle portion and rotatable about said locking axis; and
    a lost motion linkage disposed between said first lever portion and said second lever portion, including a plurality of interlocking arms formed respectively with said first and second lever portions and a pivot pin extending through said arms substantially perpendicular to said locking axis to pivotally connect said first and second lever portions with each other and about which said second lever portion rotates relative to said first lever portion, operable to transmit rotation of said second lever portion about said locking axis to pivot said first lever portion between said locked and unlocked positions and allow said second lever portion to move relative to said first lever portion in response to rotation of said second lever portion relative to said lost motion linkage and, thus, movement of said second lever portion in a direction substantially parallel to said locking axis, and breakable in response to said movement.

5. The lock assembly of claim 4, wherein said lost motion linkage includes a mechanical fuse extending through said arms substantially perpendicular to said locking axis, spaced from said pivot pin, and configured to break when said second lever portion rotates about said pivot pin relative to said first lever portion.

6. The lock assembly of claim 4, wherein said locking member includes thread defined on an outer surface of a shaft and is engaged with a plurality of positions of the steering column assembly and said pivoting of said locking member toward said locked position urges the positions of the steering column assembly together to substantially prevent adjusting movement of the steering column assembly.

7. The lock assembly of claim 6, wherein said pivoting of said locking member toward said locked position moves said thread to urge the positions of the steering column assembly together.

8. A steering column assembly comprising:
  a steering shaft;
  a collar;
  a steering column jacket that supports said steering shaft and is guidingly movable along a surface of said collar and configured to be urged either of toward and away from said surface of said collar to either of lock and unlock, respectively, said movement between said steering column jacket and collar;
  a lock assembly that is engaged with said collar and pivotable in a first angular direction about a locking axis toward a locked position for substantially preventing adjusting movement of said steering column jacket and a second angular direction about said locking axis opposite said first angular direction and toward an unlocked position spaced from said locked position for adjusting movement of said steering column jacket; and
  a lever assembly for controlling said lock assembly and including:
    a first lever portion connected to said lock assembly for pivoting movement about said locking axis between said locked and unlocked positions of said lock assembly and, thus, said steering column assembly;
    a second lever portion defining a handle portion and rotatable about said locking axis; and
    a lost motion linkage disposed between said first lever portion and said second lever portion, including a plurality of interlocking arms formed respectively with said first and second lever portions and a pivot pin extending through said arms substantially perpendicular to said locking axis to pivotally connect said first and second lever portions with each other and about which said second lever portion rotates relative to said first lever portion, operable to transmit rotation of said second lever portion about said locking axis to pivot said first lever portion between said locked and unlocked positions and allow said second lever portion to move relative to said first lever portion in response to rotation of said second lever portion relative to said lost motion linkage and, thus, movement of said second lever portion in a direction substantially parallel to said locking axis, and breakable in response to said movement.

9. The steering column assembly of claim 8, wherein said lock assembly is engaged with said collar at two positions of said collar.

10. The steering column assembly of claim 9, wherein said collar is substantially c-shaped to define first and second side walls of said collar that define said surface of said collar and said two positions at which said lock assembly is engaged with said collar and said lock assembly urges said first and second side walls together.

11. The steering column assembly of claim 10, wherein said collar defines a gap between said first and second side walls and said steering column jacket is movable relative to said collar in said unlocked position and said gap closes in said locked position.

* * * * *